United States Patent
Izadpanah et al.

(10) Patent No.: US 7,627,249 B1
(45) Date of Patent: Dec. 1, 2009

(54) METHOD AND APPARATUS FOR CONDITIONING A TRANSMISSION PATH FOR FREE-SPACE OPTICAL WIRELESS DATA COMMUNICATIONS

(75) Inventors: Hossein Izadpanah, Newburry Park, CA (US); Mehran Mokhtari, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/272,574

(22) Filed: Nov. 9, 2005

(51) Int. Cl.
*H04B 10/00* (2006.01)

(52) U.S. Cl. ...................... 398/115; 398/130

(58) Field of Classification Search ............. 398/115, 398/116
See application file for complete search history.

(56) References Cited

U.S. PATENT DOCUMENTS

| | | | |
|---|---|---|---|
| 5,053,783 A | 10/1991 | Papadopoulos | |
| 6,028,686 A | 2/2000 | Mirell et al. | |
| 6,111,237 A * | 8/2000 | Paustian | 219/687 |
| 6,377,436 B1 | 4/2002 | Margolin | |
| 6,462,847 B2 | 10/2002 | Willebrand | |
| 6,490,066 B1 | 12/2002 | Korevaar | |
| 6,643,467 B1 * | 11/2003 | Presby et al. | 398/120 |

FOREIGN PATENT DOCUMENTS

GB 1136032 12/1968

OTHER PUBLICATIONS

D. Smith, "High-Power Laser Propagation: Thermal Blooming", Proceedings of the IEEE, vol. 65, No. 12, Dec. 1977.*

* cited by examiner

*Primary Examiner*—Shi K Li
(74) *Attorney, Agent, or Firm*—Tope-McKay & Associates

(57) ABSTRACT

A method and apparatus for conditioning a wireless data communication path for the transmission of a signal wave are presented. The apparatus comprises a conditioning wave transmitter positioned to transmit a conditioning wave along at least a portion of the wireless data communication path. The conditioning wave forms a conditioning envelope about the data communication path. The wavelength of the conditioning wave is selected to remove undesirable particles from the wireless data communication path. As a result, the wireless data communication path is conditioned to provide for improved data communication. The conditioning wave may be transmitted co-, counter-, or bi-directionally with respect to the signal wave, and may form a second data channel.

6 Claims, 4 Drawing Sheets

METHOD AND APPARATUS FOR CONDITIONING A TRANSMISSION PATH FOR FREE-SPACE OPTICAL WIRELESS DATA COMMUNICATIONS

PRIORITY CLAIM

The present invention claims priority to non-provisional application Ser. No. 10/274,004, titled "Method and Apparatus for Conditioning a Transmission Path for Free-Space Optical Wireless Data Communications," filed with the U.S. Patent and Trademark Office on Oct. 17, 2002.

BACKGROUND (1) Technical Field

The present invention relates to field of optical and radio communications. More specifically, the present invention relates to a mechanism for conditioning a transmission path for free-space optical wireless data communications in adverse weather conditions.

(2) Discussion

Free-space optical wireless (FSOW) links, for example, in the infrared (IR) portion of the spectrum, as well as some directed radio frequency (RF) links, suffer from very high absorption/attenuation/turbulence from water during foggy weather as well as from other molecules present in the atmosphere. As a result, the FSOW link budget requires an extreme power dynamic range to compensate for signal attenuation/degradation and power loss. Often, the available optical power does not have sufficient dynamic range, leading to a loss of signal and link failure.

It is therefore desirable to provide a path conditioning mechanism that can aid in reducing absorption/attenuation/turbulence and other degradation, temporal and spatial, from the transmission path.

SUMMARY

The present invention provides an apparatus for conditioning a wireless data communication path for the transmission of a signal wave. The communication apparatus comprises: a conditioning wave transmitter for forming a conditioning envelope, the conditioning wave having a wavelength, where the conditioning wave creates a convection pattern; a data transmitter for transmitting a signal wave, wherein the signal wave is transmitted within at least a portion of the conditioning envelope; and a data receiver for receiving the signal wave, wherein the data transmitter and the data receiver define a communication link, whereby atmospheric particles are removed from the communication link by the convection pattern.

In another aspect, the signal wave is transmitted in a direction, and wherein the conditioning wave transmitter is positioned to transmit the conditioning wave in a manner selected from a group consisting of: co-directionally with respect to the signal wave; counter-directionally with respect to the signal wave; and both co-directionally and counter-directionally with respect to the signal wave.

In a still further aspect, the conditioning wave is pulsed. The pulse pattern may be selected from a group consisting of evenly spaced pulses and (pseudo) randomly spaced pulses. Additionally, the conditioning wave has a wavelength selected from radio-frequencies and optical wavelengths. In one aspect, the conditioning wave has a millimeter wavelength; in another, it has a microwave wavelength; and in yet another, it has an optical wavelength.

In another aspect, the invention includes a feedback channel, wherein the feedback channel provides information to the conditioning wave transmitter about the signal wave received at the data receiver and the conditioning wave transmitter adjusts the wavelength of the conditioning based on the information about the signal wave. In one aspect, the feedback channel is selected from a group consisting of: a wired feedback loop from a data receiver receiving the signal wave to the conditioning wave transmitter; and a feedback signal transmitter positioned at the data receiver for transmitting a gage signal from the data receiver to the conditioning wave transmitter, with the feedback signal having a wavelength having a degradation characteristic correlated with that of the signal wave to facilitate adjustments to the conditioning wave effectiveness of the transmitter to improve signal wave transmission conditioning.

In another aspect, the invention further includes a conditioning wave receiver, and wherein the conditioning wave transmitter transmits a conditioning wave that is received by the conditioning wave receiver. The conditioning wave, in this case, includes data, so that the conditioning wave transmitter and the conditioning wave receiver act as a second additional data channel.

In yet another aspect, the conditioning wave transmitter rotates the conditioning wave about an axis formed by the signal wave to form a spiral conditioning envelope thereabout.

In a still further aspect, the invention comprises a method for conditioning a wireless data communication path for the transmission of a signal wave. The method comprises acts of: forming a conditioning envelope from a conditioning wave having a wavelength, the conditioning wave creating a convection pattern; and transmitting a signal wave within at least a portion of the conditioning envelope, whereby atmospheric particles are removed from around the signal wave by the convection pattern.

In another aspect, the signal wave is transmitted in a direction, and in the transmitting act, the transmitter transmits the conditioning wave in a direction, with the direction of the conditioning wave being co-directional, counter-directional, or both co-directional and counter-directional with respect to the direction of the signal wave.

In a still further aspect, in the transmitting act, the conditioning wave is pulsed. The pulse pattern may be selected from a group consisting of evenly spaced pulses and randomly spaced pulses. Additionally, the conditioning wave has a wavelength selected from radio-frequencies and optical wavelengths. In different aspects, the conditioning wave has a millimeter wave wavelength, a microwave wavelength, or is an optical signal.

In another aspect, the invention further comprises acts of detecting characteristics of the signal wave at a receive point; and adjusting the wavelength of the conditioning wave at a transmission point of the signal wave based on the characteristics of the signal wave at the receive point, wherein the transmission point and the receive point define a communication link. This act of adjusting may be performed using a feedback channel selected from a group consisting of a wired feedback loop from a data receiver receiving the signal wave to the conditioning wave transmitter, and a feedback signal transmitter positioned at the data receiver for transmitting a gage signal from the data receiver to the conditioning wave transmitter, with the feedback signal having a wavelength having a degradation characteristic correlated with that of the signal wave to facilitate adjustments to the conditioning wave effectiveness of the transmitter to improve signal wave transmission conditioning.

In yet another aspect, the conditioning wave is utilized to send data.

In a still further aspect, the method further comprises an act of rotating the conditioning wave about an axis formed by the signal wave to form a spiral conditioning envelope thereabout.

BRIEF DESCRIPTION OF THE DRAWINGS

The objects, features, and advantages of the present invention will be apparent from the following detailed descriptions of the various aspects of the invention in conjunction with reference to the following drawings, where.

DETAILED DESCRIPTION

Figure 1:
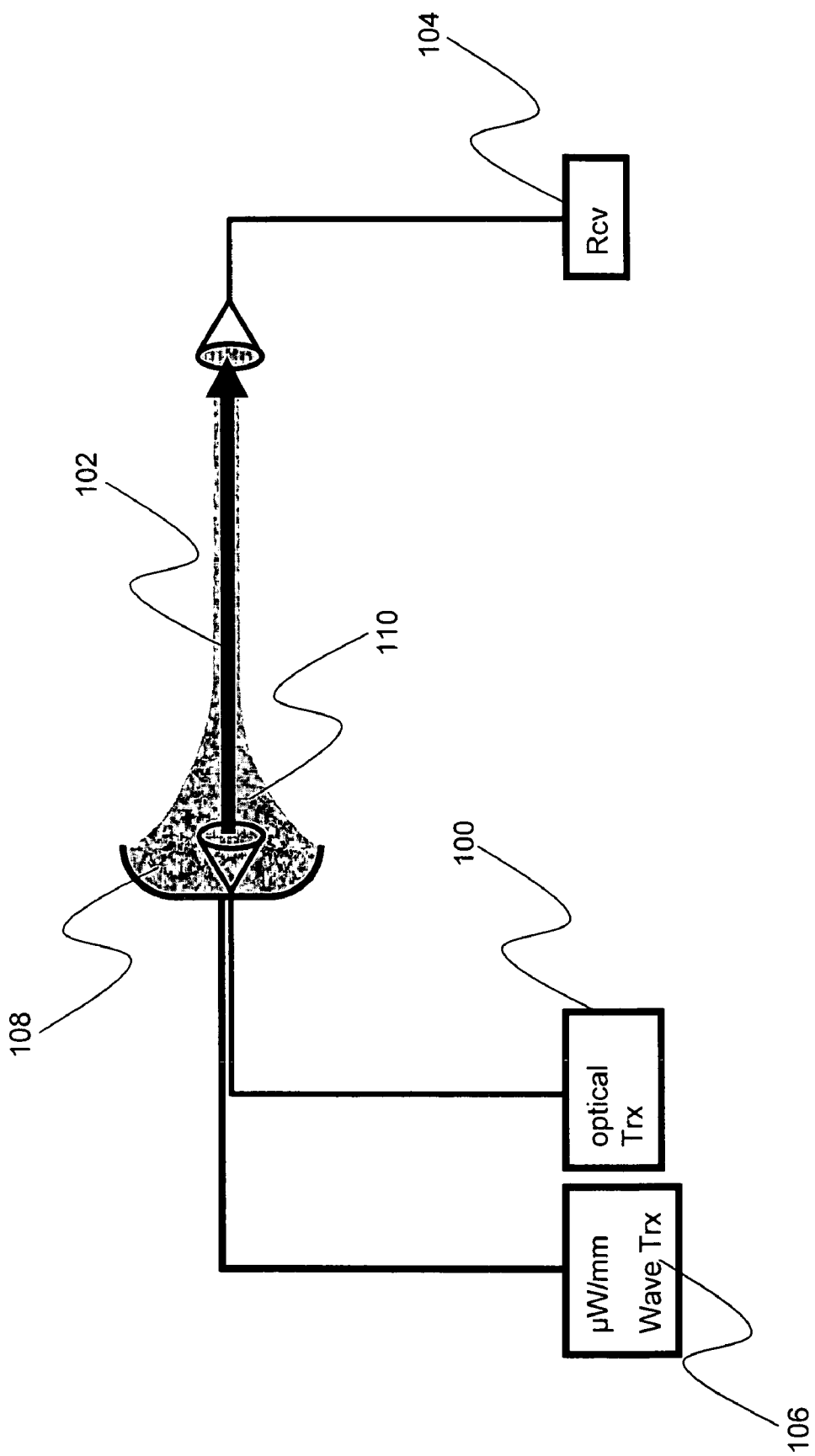
FIG. 1 is an illustrative example of an aspect of the present invention, in which a conditioning wave is transmitted co-directionally with respect to a free-space optical signal wave.

The present invention relates to field of optical and radio communications. More specifically, the present invention relates to a mechanism for conditioning, temporally and/or spatially, a "guided channel" transmission path for free-space optical wireless data communications in adverse weather conditions. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Then, a discussion of the specific details of the invention is presented.

(1) Glossary

Before describing the specific details of the present invention, a centralized location is provided in which various terms used herein and in the claims are defined. The glossary provided is intended to provide the reader with a general understanding for the intended meaning of the terms, but is not intended to convey the entire scope of each term. Rather, the glossary is intended to supplement the rest of the specification in more accurately explaining the terms used.

Conditioning Envelope—The term "conditioning envelope," as used herein indicates the volume over which the conditioning wave alters the propagation channel for low degradation (e.g., lowers the attenuation due to fog and/or other disruptive molecules). The conditioning envelope may extend for the entire length of, or a desired portion of, the signal wave. The conditioning envelope may be in the form of a cone or cylinder through which the signal wave passes, or it may be in the form of a tube surrounding the signal wave. In addition, multiple conditioning envelopes of the same or different frequencies (to eliminate a wider variety of degrading/interfering substances) may be transmitted co-directionally with, counter-directionally to, or bi-directionally along the path of the signal wave. The conditioning envelope generally refers to the volume in which the conditioning wave is effective for impacting the channel transmission for the signal waves. The actual volume over which the conditioning wave is transmitted may be larger.

Conditioning Wave—The term "conditioning wave," as used herein indicates the type of energy used to heat/disperse/eliminate fog and/or other disruptive molecules from the volume of the conditioning envelope and to unify the channel for low signal degradation due to turbulence. The frequency (wavelength) of the conditioning channel is tuned to the atmospheric absorption line for thermal blooming. Non-limiting examples of conditioning waves include microwave, millimeter wave, and optical signals.

Optical—The term optical, as used herein refers to electromagnetic energy that can be manipulated by optical techniques, and is not intended to be limited to the visible spectrum. Thus, infrared and other non-visible parts of the spectrum are considered within the scope of the term as used.

Signal Wave—The "signal wave" is the data signal transmission, typically in the form of a laser (i.e., a narrowly focused signal). The signal wave is encompassed by the conditioning envelope along a path from the data signal wave source (transmitter) and the data signal wave receiver. It is desirable that the data signal wave and the conditioning wave be selected such that at least the portion of the data signal wave that is relevant for data transmission is contained within the conditioning envelope.

(2) Discussion

The present invention provides a technique for ensuring a high degree of availability for terrestrial, "all weather" (e.g., rain, fog, and snow) RF/optical wireless communication links suitable for wireless access, distribution, and backbone network interconnections. The approach presented provides "conditioned" channels which ensure low attenuation during times when weather conditions are sub-optimal (e.g., in foggy weather). The creation of the low attenuation/absorption conditioning envelope, or "waveguide," in the air is achieved by co-, counter-, and/or bi-directional propagated conditioning waves (e.g., laser/microwave/mm-wave beam(s)). The conditioning wave is generated at a wavelength selected for high water absorption so that it heats the atmosphere as it travels through the air. The introduction of the localized heat by the conditioning wave along the signal wave causes a temperature gradient and "burns off" the regional/local humidity, activating a convection effect, thereby transforming the channel within the area of the conditioning envelope into a low water-density region. In addition, the density of other "interfering" gases such as nitrogen, oxygen, etc. may also be decreased along the conditioning envelope by concurrently exposing the channel to beams of various wavelengths, in the absorption bands of the respective molecules. Through this procedure, a convection pattern will form, and will tend to create a region with low gas density during the data signal transmission. The actual formation of the conditioning envelope is caused by either constant or pulsed wave power. The co-/counter-propagation laser beam experiences lower absorption/attenuation, resulting in decreased channel attenuation and enhanced link availability. The increased wireless network reliability provides increased network aggregate capacity under all-weather, diverse, atmospheric conditions, affording higher channel data rates (when compared to non-conditioned channels), and link fail/safe operation. Non-limiting examples of frequencies used for the conditioning wave include those for reducing fog (comprising $H_2O$ molecules), which has absorption bands within around 20 to 200 GHz, and for dispersing/eliminating $O_2$, which resonates at frequencies of about 60, 120, etc. GHz.

An illustrative diagram of an example of the present invention is shown in FIG. 1. In FIG. 1, a data transmitter 100 transmits a signal (data) wave 102 to be received by a data receiver 104. A conditioning wave transmitter 106 transmits a conditioning wave 108 such that it forms a conditioning envelope 110 about the signal wave 102. As mentioned in the glossary, the conditioning wave 108 can be of any useful wavelength, can be formed about the signal wave 102 in any desired pattern, can be continuous, pulsed with even or uneven intervals, and can be one-directional or bi-directional. Note that the conditioning envelope of FIG. 1 is shown as a continuous wave. In the case shown, the conditioning wave 108 is in the form of a microwave propagated from an antenna or antenna array to provide a gradual focusing characteristic along the path as its intensity decreases due to absorption. Due to the decay of the conditioning wave 108 power (e.g., the laser/microwave/mm-wave power) along the transmission length, it is desirable that the conditioning wave 108 beam be shaped to maintain a uniform power density over the desired length along the propagation path. Also, a spiral channel may be created by rotating the source of the conditioning wave 108 off its axis to create a protective conditioned channel.

Figure 2:
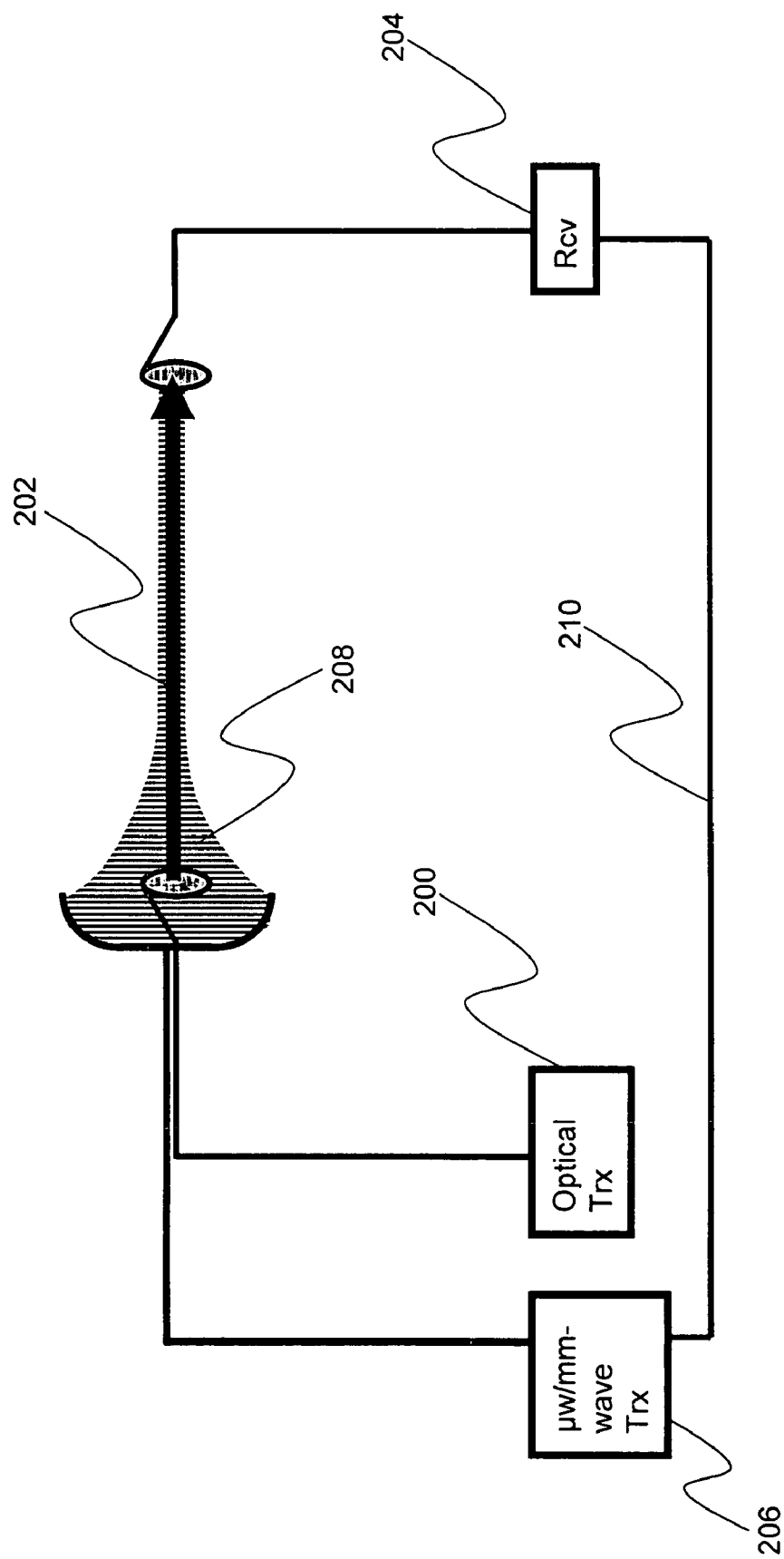
FIG. 2 is an illustrative example of an aspect of the present invention, in which a conditioning wave is transmitted co-directionally with respect to a signal wave, and in which the conditioning wave is pulsed in time for temporal/spatial effect.

Another version of the present invention is presented in FIG. 2, which depicts a data transmitter 200 transmitting a signal wave 202 to be received by a data receiver 204. In this case, the conditioning wave transmitter 206 transmits a conditioning wave 208 in a pulsating manner. The pulsation technique is of use in cases where the nature of the conditioning wave transmitter 206 and the available power make a pulsating and bursty source desirable (e.g., for periodic/irregular spatial conditioning for different weather responses). The pulses may be provided in a periodic or pseudo-random manner. Also, a feedback channel 210 may be provided to help gauge the power level and/or pulse rate needed from the conditioning wave transmitter 206 to ensure a clear path for the signal wave 202. The feedback channel 210 may be in the form of a "hard-wired" feedback loop that provides feedback based on the power of the signal wave 202 as received at the data receiver 204, or it may be in the form of a wireless feedback wave transmitted in the reverse direction along the path of the signal wave 202, and received at the transmitter (in this case, the feedback wave is either of the same wavelength as the signal wave 202, or is of a wave that has a degradation characteristic correlated with that of the signal wave—e.g., a gage signal). The feedback channel 210 is used to adjust the transmission characteristics (e.g., signal power and possibly signal frequency) of the conditioning wave transmitter 206 in order to adjust to varying conditions. Note also that the conditioning wave may be received at a conditioning wave receiver (positioned at or near the signal receiver 204), such that the conditioning wave can carry other data, acting as a second data channel. In the case of counter-propagating conditioning channel, the conditioning channel can carry the feedback information signal.

Figure 3:
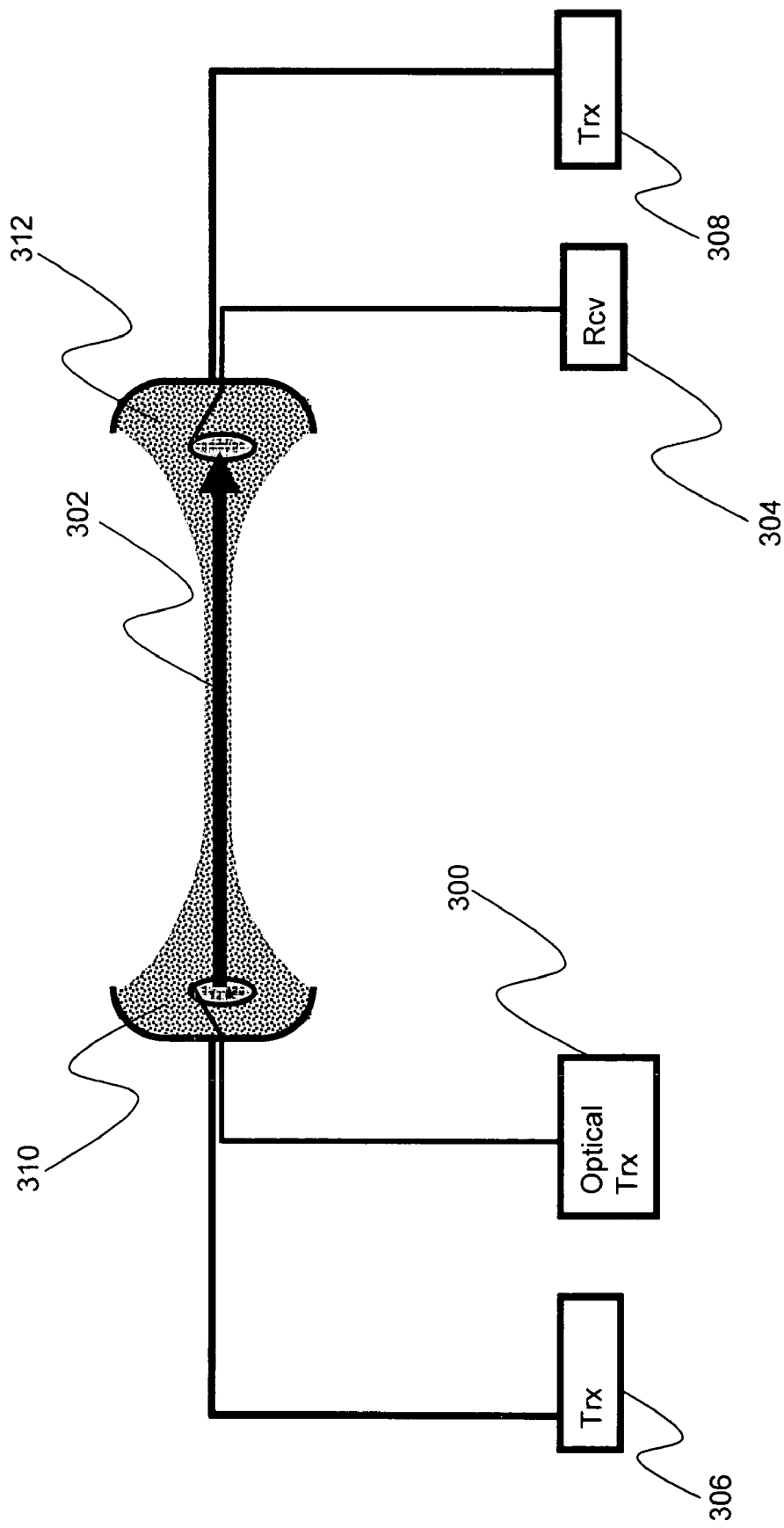
FIG. 3 is an illustrative example of an aspect of the present invention, in which a conditioning wave is transmitted both co- and counter-directionally with respect to a signal wave.

A bi-directional version of the present invention is depicted in FIG. 3, wherein a data transmitter 300 transmits a signal (data) wave 302 to be received by a data receiver 304. In this case, conditioning wave transmitters 306 and 308 transmit conditioning waves 310 and 312 in both co- and counter-propagation directions with respect to the signal wave 302. The conditioning waves 310 and 312 may be of the same wavelength or of different wavelengths, depending on the goals of a particular system. This scheme generally offers a more uniform conditioning/heating along the path, and helps to ensure a higher degree of free-space optical wireless link availability under heavy fog weather.

Figure 4:
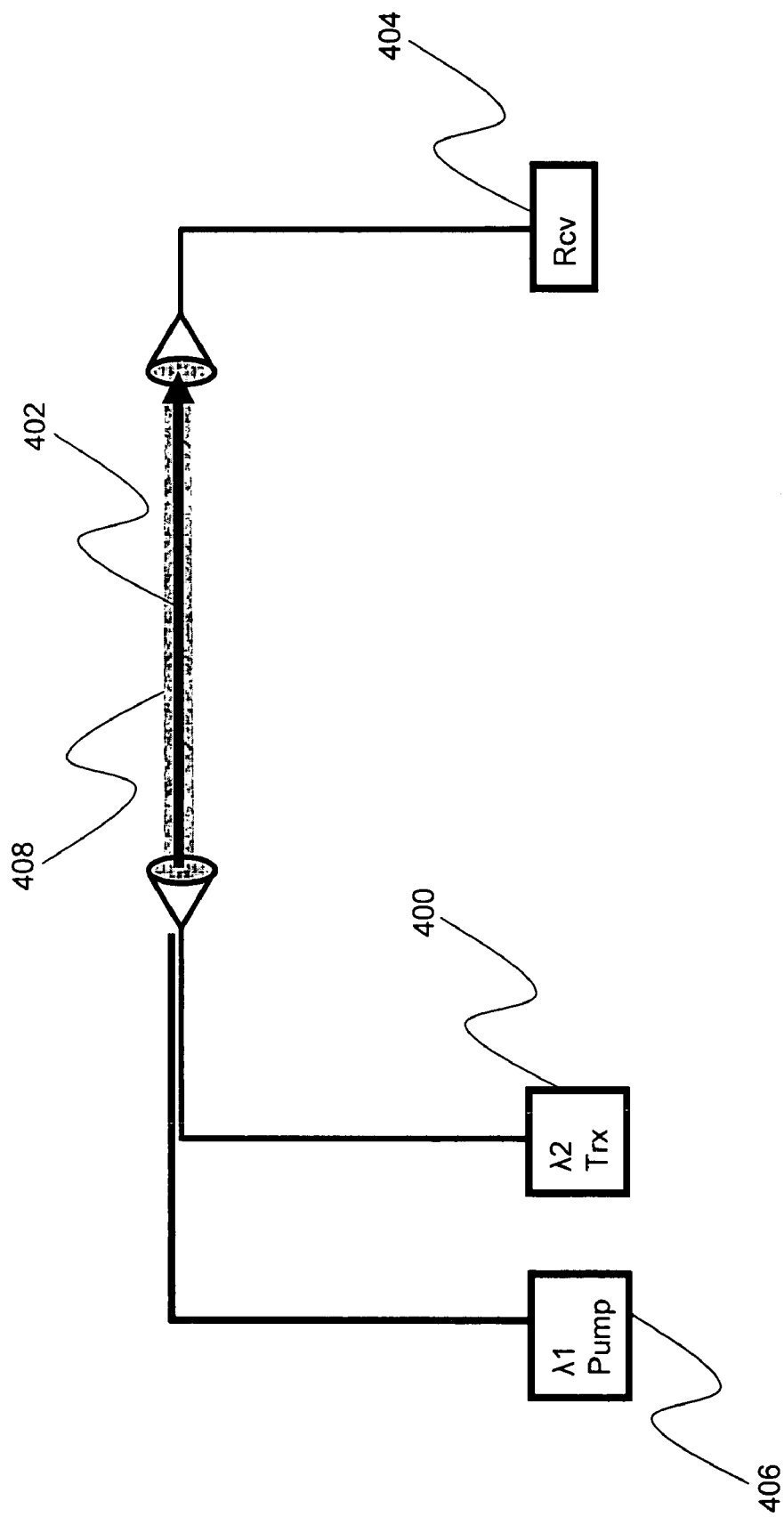
FIG. 4 is an illustrative example of an aspect of the present invention, in which a conditioning wave, in the form of a laser, is transmitted co-directionally with respect to a signal wave.

Another example of the present invention is shown in FIG. 4, where a transmitter 400 transmits a signal wave 402 to be received by a receiver 404. In this case, the conditioning wave transmitter 406 generates a conditioning wave 408 in the form of a laser of a second wavelength (as opposed to the wavelength of the signal wave 402), selected for its high degree of water absorption. A non-limiting example is using a 1480 nm laser as the channel-heating wavelength (in the oxygen-hydrogen absorption band) for the conditioning wave 408, and a conventional fiber-optic communication wavelength of 1300 or 1550 nm for the signal wave 402. The propagation of the conditioning wave 408 with respect to the signal wave 402 could be co- or counter-propagation or bi-directional.

Coaxially-propagated links presented herein could be used as "hybrid," all-weather complementary wireless links. Thus, for example, a conditioning wave operating at millimeter-wave frequencies could be used not only to condition the channel for the laser link, but also to provide a parallel communicating channel as a bypass communicating channel to accommodate data rates switched from the free-space optical link. The dual-functionality of the hybrid link would allow the flexibility of selective traffic routing to alternate end-users for geographical diversity, multi-service, and multi-cast/broadcast operation.

Regardless of the embodiment chosen, the method and apparatus disclosed herein improves channel conditions, especially in the presence of atmospheric gasses, particles in the atmosphere, rain, fog, and high wind conditions. For example, not only does the conditioning wave help to eliminate rain and fog when they are obscuring the receiver, but the disclosed system and method also improves channel conditions when the transmitter is deployed on the edge of a high-rise building, where the wind may create a high pressure "wall" in front of the transmitter. The improvement in the channel is created by selecting the appropriate wavelength or wavelengths for the conditioning wave. The conditioning wave may create a conditioning envelope by absorbing the atmospheric particles (such as rain); however, when the appropriate wavelengths are selected, the conditioning wave also creates a convection pattern which tends to create a region with low gas density. Thus, atmospheric particles or a high pressure "wall" may be removed from the conditioning envelope by the convection pattern, improving the channel conditions.

A few example design parameters that can aid in tailoring the present invention to a particular application include:

- Selecting the conditioning wave for an optimum heating characteristic, absorption, heat gradient, and convection current.
- Determining the conditioning wave's wavelength and power as a function of water droplet size and fog density, and channel physical diameter volume.

Selecting the microwave antenna shape, number of elements (in the case of antenna arrays), and the focusing characteristics for uniform heating but minimum power utilization.

Determining the minimum and maximum demanded channel quality requirements to select the proper equipment for the combined conditioning/data architecture (whether co-, counter-, or bi-directional).

Determining the channel thermodynamic characteristics as well as the equipment characteristics in order to determine whether to use a pulsating or continuous format for the conditioning wave.

Due to the presence of multiple wavelengths along the signal wave path (e.g., channel-forming wavelengths and data-communication wavelengths), the detectors need to be frequency-selective. The selectivity and the impact of the presence of the other wavelengths need to be considered during system design.

Optimization of high-speed wireless network availability in all-weather and diverse atmospheric conditions should be sought for the link fail/safe operation and path protection.

What is claimed is:

1. A communication apparatus comprising:

a conditioning wave transmitter for forming a conditioning envelope, the conditioning wave having a radio-frequency wavelength, where the conditioning wave creates a convection pattern;

an electro-magnetic data transmitter for transmitting a signal wave, wherein the signal wave is transmitted within at least a portion of the conditioning envelope; and a data receiver for receiving the signal wave, wherein the data transmitter and the data receiver define a communication link, whereby atmospheric particles are removed from the communication link by the convection pattern; and further comprising a feedback channel, wherein the feedback channel provides information to the conditioning wave transmitter about the signal wave received at the data receiver and the conditioning wave transmitter adjusts the wavelength of the conditioning wave based on the information about the signal wave.

2. The apparatus of claim 1, wherein the feedback channel is selected from a group consisting of: a wired feedback loop from a data receiver receiving the signal wave to the conditioning wave transmitter; and a feedback signal transmitter positioned at the data receiver for transmitting a gage signal from the data receiver to the conditioning wave transmitter, with the feedback signal having a wavelength having a degradation characteristic correlated with that of the signal wave to facilitate adjustments to the conditioning wave effectiveness of the transmitter to improve signal wave transmission conditioning.

3. A communication apparatus comprising:

a conditioning wave transmitter for forming a conditioning envelope, the conditioning wave having a radio-frequency wavelength, where the conditioning wave creates a convection pattern;

an electro-magnetic data transmitter for transmitting a signal wave, wherein the signal wave is transmitted within at least a portion of the conditioning envelope; and a data receiver for receiving the signal wave, wherein the data transmitter and the data receiver define a communication link, whereby atmospheric particles are removed from the communication link by the convection pattern; and further comprising a conditioning wave receiver, and wherein the conditioning wave transmitter transmits a conditioning wave that is received by the conditioning wave receiver, where the conditioning wave includes data, whereby the conditioning wave transmitter and the conditioning wave receiver act as a second additional data channel.

4. A method for conditioning a wireless data communication path for the transmission of a signal wave, the method comprising acts of:

forming a conditioning envelope from a conditioning wave having a radio-frequency wavelength, the conditioning wave creating a convection pattern;

transmitting a signal wave within at least a portion of the conditioning envelope, whereby atmospheric particles are removed from around the signal wave by the convection pattern;

detecting characteristics of the signal wave at a receive point; and adjusting the wavelength of the conditioning wave at a transmission point of the signal wave based on the characteristics of the signal wave at the receive point, wherein the transmission point and the receive point define a communication link.

5. The method of claim 4, wherein the act of adjusting is performed using a feedback channel selected from a group consisting of: a wired feedback loop from a data receiver receiving the signal wave to the conditioning wave transmitter; and a feedback signal transmitter positioned at the data receiver for transmitting a gage signal from the data receiver to the conditioning wave transmitter, with the feedback signal having a wavelength having a degradation characteristic correlated with that of the signal wave to facilitate adjustments to the conditioning wave effectiveness of the transmitter to improve signal wave transmission conditioning.

6. A method for conditioning a wireless data communication path for the transmission of a signal wave, the method comprising acts of:

forming a conditioning envelope from a conditioning wave having a radio-frequency wavelength, the conditioning wave creating a convection pattern; and transmitting a signal wave within at least a portion of the conditioning envelope, whereby atmospheric particles are removed from around the signal wave by the convection pattern; and further comprising an act of utilizing the conditioning wave to send data.

* * * * *